US009853835B2

(12) United States Patent
Brust et al.

(10) Patent No.: US 9,853,835 B2
(45) Date of Patent: Dec. 26, 2017

(54) SYSTEM AND METHOD OF DYNAMIC SWITCHING OF ADVANCED CALLING FEATURE IN LTE NETWORKS

(71) Applicant: Samsung Electronics Co., Ltd., Gyeonggi-do (KR)

(72) Inventors: Steve Todd Brust, Raritan, NJ (US); Srinivas Kote Narasimhamurthy, Hillsborough, NJ (US); Colm Malone, Basking Ridge, NJ (US); Michael Anthony Schiksnis, Flanders, NJ (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/878,347

(22) Filed: Oct. 8, 2015

(65) Prior Publication Data
US 2016/0344572 A1 Nov. 24, 2016

Related U.S. Application Data

(60) Provisional application No. 62/163,773, filed on May 19, 2015.

(51) Int. Cl.
*H04L 12/66* (2006.01)
*H04L 12/26* (2006.01)
(Continued)

(52) U.S. Cl.
CPC .............. *H04L 12/66* (2013.01); *H04L 43/16* (2013.01); *H04L 65/1016* (2013.01);
(Continued)

(58) Field of Classification Search
CPC .. H04W 36/0066; H04W 76/04; H04W 36/06
(Continued)

(56) References Cited

U.S. PATENT DOCUMENTS

| 2010/0040020 | A1 | 2/2010 | Chen |
| 2014/0126544 | A1 | 5/2014 | Khay-Ibbat et al. |

(Continued)

OTHER PUBLICATIONS

Extended European Search Report dated Oct. 7, 2016 in connection with European Application No. 16166603.7, 7 pages.

*Primary Examiner* — Cong Tran

(57) ABSTRACT

A user equipment configured to operate in a Long Term Evolution (LTE) network. The user equipment comprises transceiver circuitry that operates the user equipment in either of two modes, the two modes comprising: i) a first mode in which the transceiver circuitry performs packet data services in the LTE network and performs voice calls in the LTE network using a Voice over LTE (VoLTE) service; and ii) a second mode in which the transceiver circuitry performs packet data services in the LTE network and performs voice calls in a legacy network. The user equipment also comprises a controller that compares a link quality associated with a radio link to the LTE network to at least one threshold value and, in response to the comparison, controls switching the user equipment between the first mode and the second mode. The controller switches the user equipment from the first mode to the second mode if the link quality falls below a first drop threshold value associated with an RSRP value or an SINR value. The controller switches the user equipment from the first mode to the second mode if the link quality falls below the first drop threshold value for more than a drop period of time threshold value.

10 Claims, 7 Drawing Sheets

(51) Int. Cl.
*H04W 8/14* (2009.01)
*H04L 29/06* (2006.01)
*H04W 36/00* (2009.01)
H04W 76/02 (2009.01)
H04W 88/06 (2009.01)

(52) U.S. Cl.
CPC ......... *H04W 8/14* (2013.01); *H04W 36/0022* (2013.01); *H04W 36/0027* (2013.01); *H04W 76/026* (2013.01); *H04W 88/06* (2013.01)

(58) Field of Classification Search
USPC ............... 455/436–439, 414.1; 370/331–332
See application file for complete search history.

(56) References Cited

U.S. PATENT DOCUMENTS

| | | | |
|---|---|---|---|
| 2014/0219246 A1* | 8/2014 | Khay-Ibbat ....... | H04W 36/0022 370/331 |
| 2015/0003411 A1 | 1/2015 | Sandhu et al. | |
| 2015/0078337 A1* | 3/2015 | Kim .................... | H04L 65/1083 370/331 |
| 2015/0094065 A1* | 4/2015 | Su ........................ | H04W 36/30 455/436 |
| 2015/0131619 A1 | 5/2015 | Zhu et al. | |
| 2015/0282013 A1* | 10/2015 | Kim .................... | H04L 65/1069 370/331 |
| 2015/0350971 A1* | 12/2015 | Khay-Ibbat ....... | H04W 36/0066 455/436 |
| 2016/0255527 A1* | 9/2016 | Yang .................... | H04W 24/10 |

\* cited by examiner

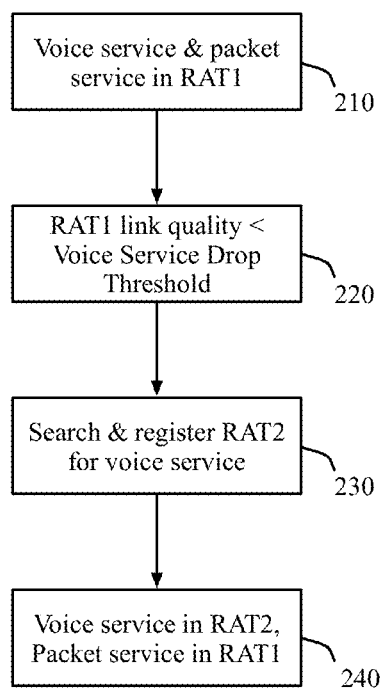 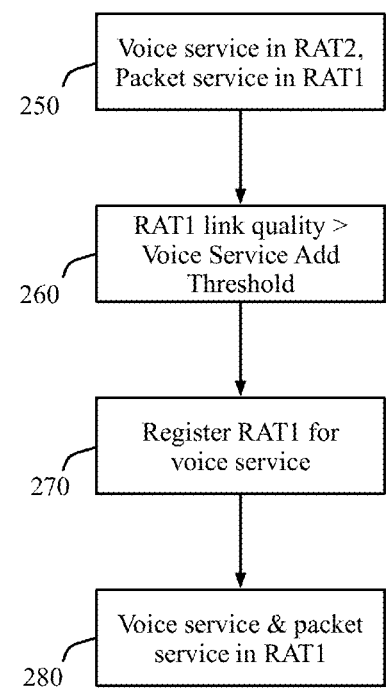
FIGURE 2A
FIGURE 2B

SYSTEM AND METHOD OF DYNAMIC SWITCHING OF ADVANCED CALLING FEATURE IN LTE NETWORKS

CROSS-REFERENCE TO RELATED APPLICATION AND CLAIM OF PRIORITY

The present application is related to U.S. Provisional Patent No. 62/163,773, filed May 19, 2015, entitled "DYNAMIC SWITCHING OF ADVANCED CALLING FEATURE". Provisional Patent No. 62/163,773 is assigned to the assignee of the present application and is hereby incorporated by reference into the present application as if fully set forth herein. The present application hereby claims priority under 35 U.S.C. §119(e) to U.S. Provisional Patent No. 62/163,773.

TECHNICAL FIELD

The present application relates generally to wireless networks and, more specifically, to a wireless network providing Voice over LTE (VoLTE) service.

BACKGROUND

Cell phone carriers operating Internet Protocol (IP) Multimedia Subsystem (IMS) networks are introducing new services to wireless subscribers. One service, known as Advanced Call Feature (ACF), enables a user equipment (e.g., mobile phone, laptop, tablet, etc.) to make Voice over LTE (VoLTE) phone calls. VoLTE uses IP packets to support voice calls, potentially offering much higher quality calls and faster set-up times, among other things, than traditional 2G services that provide circuit-switched voice calls.

However, the quality and availability of VoLTE is determined by the quality of the coverage of the local LTE network. This means that a user equipment (UE) that is connected to an LTE network in a weak coverage area may attempt a VoLTE call even though the network conditions may not be sufficient to give the end-user the same good experience the mobile phone subscriber may be accustomed to with a legacy radio access technology (RAT), such as CDMA 1×RTT. This can result in dropped calls, muted audio, and distorted audio, among other things. Additionally, this may cause the subscriber to blame the mobile phone for the poor quality of the phone call, rather than the LTE network conditions.

Therefore, there is a need in the art for systems and methods for offering Advanced Calling Feature (ACF) service to a mobile phone subscriber. In particular, there is a need for systems and methods that provide an improved VoLTE experience during periods of poor coverage in an LTE network.

SUMMARY

To address the above-discussed deficiencies of the prior art, it is a primary object to provide a user equipment configured to operate in a Long Term Evolution (LTE) network. The user equipment comprises: 1) transceiver circuitry configured to operate the user equipment in either of two modes, the two modes comprising: i) a first mode in which the transceiver circuitry performs packet data services in the LTE network and performs voice calls in the LTE network using a Voice over LTE (VoLTE) service; and ii) a second mode in which the transceiver circuitry performs packet data services in the LTE network and performs voice calls in a legacy network; and 2) a controller coupled to the transceiver circuitry and configured to compare a link quality associated with a radio link to the LTE network to at least one threshold value and, in response to the comparison, to control switching the user equipment between the first mode and the second mode.

In one embodiment of the disclosure, the controller switches the user equipment from the first mode to the second mode if the link quality falls below a first drop threshold value associated with a Reference Signal Received Power (RSRP) value.

In another embodiment of the disclosure, the controller switches the user equipment from the first mode to the second mode if the link quality falls below the first drop threshold value for more than a drop period of time threshold value.

In still another embodiment of the disclosure, the controller switches the user equipment from the first mode to the second mode if the link quality falls below a second drop threshold associated with a Signal to Interference plus Noise Ratio (SINR) value.

In yet another embodiment of the disclosure, the controller switches the user equipment from the first mode to the second mode if the link quality falls below the second drop threshold value for more than a drop period of time threshold value.

In a further embodiment of the disclosure, the controller switches the user equipment from the second mode to the first mode if the link quality rises above a first add threshold value associated with a Reference Signal Received Power (RSRP) value.

In a still further embodiment of the disclosure, the controller switches the user equipment from the second mode to the first mode if the link quality rises above the first add threshold value for more than an add period of time threshold value.

In a yet further embodiment of the disclosure, the controller switches the user equipment from the second mode to the first mode if the link quality rises above a second add threshold associated with a Signal to Interference plus Noise Ratio (SINR) value.

In an embodiment of the disclosure, the controller switches the user equipment from the second mode to the first mode if the link quality rises above the second add threshold value for more than an add period of time threshold value.

In another embodiment, the controller switches the user equipment between the first mode and the second mode only if a pre-defined time delay has elapsed since the previous switching between the first mode and the second mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A and 2B are flow diagrams depicting dynamic switching of Advanced Calling (DSAC) feature according to one embodiment of the disclosure.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless user equipment.

The present disclosure describes a new capability for wireless user equipment that provides a dynamic switching of the Advanced Calling Feature (VoLTE) service in weak LTE coverage areas. The DSAC service results in fewer dropped calls and improved audio quality for those users (or subscribers) who are in a weak LTE coverage area, while allowing the device to remain attached to LTE for packet switched data. The DSAC service implements service quality thresholds that allow the user equipment to switch in and out of VoLTE service based on the network RF conditions.

Figure 1:
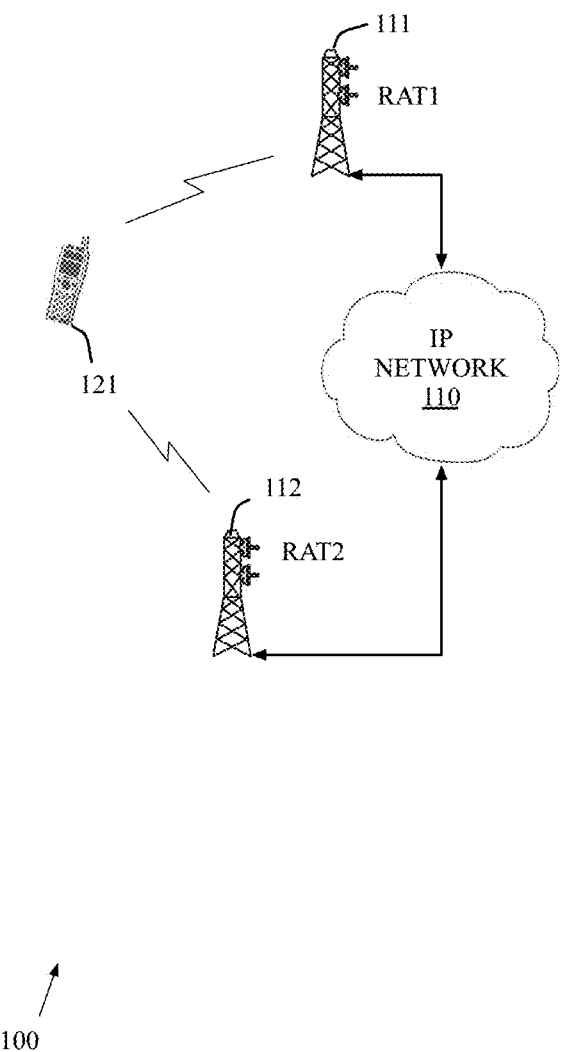
FIG. 1 illustrates user equipment in a coverage area in which VoLTE service is provided by an advanced radio access technology and conventional voice service is provided by a legacy radio access technology according to one embodiment of the disclosure.

FIG. 1 illustrates user equipment (UE) 121 in coverage area 100, in which VoLTE service is provided by an advanced radio access technology (RAT1) network and a conventional voice service is provided by a legacy radio access technology (RAT2) network according to one embodiment of the disclosure. Coverage area 100 includes base station (BS) 111, which is part of the RAT1 network and provides VoLTE service to UE 121. Coverage area 100 includes base station (BS) 112, which is part of the RAT2 network and provides a legacy voice service, such as 1×RTT CDMA) to UE 121. BS 111 and BS 112 are both connected to a communication backbone, which may include, for example, Internet protocol (IP) network 100 (hereafter, Internet 100) and/or a circuit-switched network (not shown), which may include a mobile switching center (MSC).

It is noted that the term "base station" may be commonly used in some types of networks, such as CDMA2000 systems or some 3GPP systems. But "base station" is not universally used in all types of radio access technology (RAT). In some types of networks, the term "base station" may be replaced by "eNodeB", or "eNB", or "access point". For the purposes of simplicity and consistency, the term "base station" is used in this disclosure document, and in the claims in particular, to refer to the network infrastructure device that provides wireless access to user equipment.

Similarly, the term "user equipment" may be commonly used in some types of networks, but not in others. In some types of networks, the term "user equipment" may be replaced by "subscriber station", "mobile station", "remote terminal", "wireless terminal" or the like. For the purposes of simplicity and consistency, the term "user equipment", or "UE", or mobile phone, may be used in this disclosure document to refer to a remote wireless device that accesses the network infrastructure device (i.e., the base station).

In the descriptions below, the following abbreviations and parameters may be used:

1) Reference Signal Received Power (RSRP) is the linear average of reference signal power across the specified bandwidth, in the number of resource elements (REs). This is the most important item a user equipment (UE) has to measure for cell selection, reselection, and handover. Since this measures only the reference power, it is assumed this is the strength of the wanted signal. However, it does not give any information about signal quality. RSRP gives the signal strength of the desired signal, not the quality of the signal.

2) Signal to Interference plus Noise Ratio (SINR).

3) The "rsrp_hVolte_drop" parameter is the defined threshold value for the DSAC feature that states the RSRP threshold for switching out of advanced calling mode (i.e., LTE only mode) to switch into SRLTE mode. The rsrp_hVolte_drop threshold value is a UE-configurable value. An exemplary value of the rsrp_hVolte_drop threshold value may be −116 dBm.

The "SINR_hVolte_drop" parameter is the defined threshold value for the DSAC feature that states the SINR threshold for switching out of advanced calling mode (i.e., LTE only mode) to switch into SRLTE mode. The SINR_hVolte_drop threshold value is a UE-configurable value. An exemplary value of the SINR_hVolte_drop threshold value may be −3 dB.

The "t_hVolte_drop" parameter is the defined threshold value for the DSAC feature that states the period of time for which the RSRP value must fall below the rsrp_hVolte_drop threshold value or the SINR value must fall below the SINR_hVolte_drop threshold value before the UE decides to switch out of LTE only mode. The t_hVolte_drop threshold value is a UE-configurable value. An exemplary value of the t_hVolte_drop threshold value may be 15 seconds.

The "rsrp_hVolte_add" parameter is the defined threshold value for the DSAC feature that states the RSRP threshold for switching into advanced calling mode (i.e., LTE only mode) with IMS registration for VoLTE call feature. The rsrp_hVolte_add threshold value is a UE-configurable value. An exemplary value of the rsrp_hVolte_add threshold value may be −106 dBm.

The "SINR_hVolte_add" parameter is the defined threshold value for the DSAC feature that states the SINR threshold for switching into advanced calling mode (i.e., LTE only mode) with IMS registration for VoLTE call feature. The SINR_hVolte_add threshold value is a UE-configurable value. An exemplary value of the SINR_hVolte_add threshold value may be 5 dB.

The "t_hVolte_add" parameter is the defined threshold value for the DSAC feature that states the period of time for which the RSRP value must rise above the rsrp_hVolte_add threshold value and/or the SINR value must rise above the SINR_hVolte_add threshold value before deciding to switch out of SRLTE mode. The t_hVolte_add threshold value is UE-configurable. An exemplary value of the t_hVolte_add threshold value may be 15 seconds.

The "hvolte_drop_rescan_timer" parameter is a timer threshold value for triggering the next periodic RSRP/SINR measurements when CDMA is not available (e.g., 15 minutes).

The "Volte_keepaway_timer" parameter is a timer threshold value for delaying periodic measurements after switching from CSFB Mode (Volte) to SRLTE Mode (1×CS). This is to prevent frequent mode switching in weak LTE areas.

The proposed DSAC feature involves two modes of operation: 1) LTE only mode and 2) single radio LTE (SRLTE) mode.

In LTE only mode, the user equipment (UE) is capable of performing voice calls over IP Multimedia Subsystem (IMS) in an LTE network along with packet services in the same LTE network. While operating in LTE only mode, the UE supports all advanced services like VoLTE, RCS, ePDG, and the like over LTE. The UE remains in LTE Only mode based on the DSAC signal thresholds above being satisfied. The UE is enabled with VoLTE advance calling feature in settings, the network supports VoLTE services, and the UE is provisioned for VoLTE services.

The UE can trigger a voice call over IMS in the LTE network and packet services in LTE network. In this mode, the UE initially attaches in the LTE network after power up with IMS PDN attached successfully as a voice centric device and then the UE evaluates LTE signal strength based on RSRP and SINR with the DSAC-defined thresholds (i.e., rsrp_hVolte_add, SINR_hVolte_add). If the measured LTE signal strength (RSRP, SINR) is greater than the DSAC threshold, then the UE device IMS registers with all VoLTE feature tags including "voice call" and the UE remains in LTE only mode for VoLTE calls, including both mobile-originated (MO) calls and mobile-terminated (MT) calls. In this mode, the UE periodically monitors the LTE signal strength based on DSAC thresholds above and decides whether to switch from LTE only mode to SRLTE mode or to remain in LTE only mode.

In SRLTE mode, the UE performs dual standby with LTE and 1× services. The SRLTE mode monitor the 1× paging channel while camped on the LTE network and operates in a hybrid LTE and 1× mode. In SRLTE mode, the UE operates in dual registration mode, registered to the 1×RTT (or legacy) network for voice services to the LTE network for data packet services. The UE switches or remains in the SRLTE mode after power on and boot-up in the LTE area based on the DSAC signal thresholds.

After powering on the UE, if the DSAC thresholds are not met to remain in LTE only mode or if the UE is not configured for VoLTE/Advanced Calling Feature, the UE moves to SRLTE mode and sends IMS registration without the VoLTE feature tags. In this mode, all MO and MT voice calls are processed in the legacy (1×) network and packet data is processed in the LTE network. In SRLTE mode, the UE periodically monitors the LTE signal strength (RSRP and SINR) based on the DSAC defined thresholds. If the threshold is satisfied for moving to LTE only mode, the UE sends and IMS registration with VoLTE feature tags included and moves to LTE Only Mode. If the threshold is not satisfied for moving to LTE only mode, the UE remains in SRLTE mode and processes all voice calls over the legacy (1×) network and all packet services in the LTE network. In this mode, the UE periodically monitors for LTE signal conditions (RSRP and SINR) with DSAC defined thresholds and makes decision based on the evaluation.

FIGS. 2A and 2B are flow diagrams depicting a dynamic switching of the Advanced Calling Feature (DSAC) according to one embodiment of the disclosure. FIG. 2A illustrates UE 121 switching modes from operating with voice service and packet service in RAT1 to voice service in RAT2 and packet service in RAT1. FIG. 2A illustrates the reverse situation, in which UE 121 switches modes from operating with voice service in RAT2 and packet service in RAT1 to both voice service and packet service in RAT1.

In FIG. 2A, UE 121 operates in LTE only Mode. UE 121 initially registers for both voice service and packet service in the RAT1 network, such as an LTE network (step 210). At some point during routine operation, UE 121 determines that the RAT1 link quality has dropped below (<) a DSAC-defined Voice Service Drop threshold value (step 220). In response, UE 121 searches for, and register with, the RAT2 network, such as an 1×RTT CDMA network for voice services (step 230). Thereafter, UE 121 operates in the RAT2 network for voice service and operates in the RAT1 network for packet data service (step 240).

In FIG. 2B, UE 121 operates in single radio LTE (SRLTE) mode, in which UE 121 is initially registered for voice service in the RAT2 network (e.g., 1×RTT CDMA) and packet service in the RAT1 network, such as an LTE network (step 250). At some point during routine operation, UE 121 determines that the RAT1 link quality has gone above (>) a DSAC-defined Voice Service Add threshold value (step 260). In response, UE 121 registers with the RAT1 network (i.e., LTE) for voice service (step 270). Thereafter, UE 121 operates in the RAT1 network for both voice service and packet data service (step 280).

Figure 3:
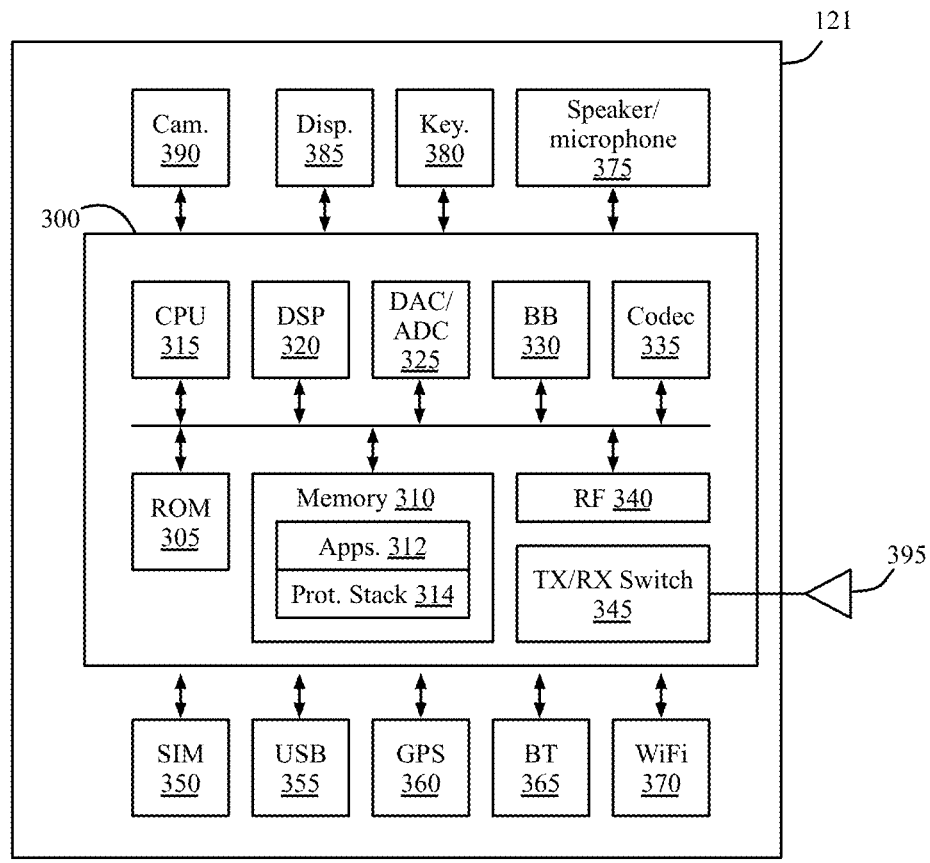
FIG. 3 illustrates in greater detail exemplary user equipment (UE) that implements the DSAC feature according to embodiments of the disclosure.

In general, user equipment (UE) 121 may be any type of wireless capable device, including a mobile phone, a desktop computer, a laptop computer, a tablet device, and the like. FIG. 3 below illustrates one particular embodiment of the present disclosure in which it is assumed that UE 121 is implemented as a mobile phone 121. However, those skilled in the art will understand that references below to "mobile phone 121" in FIG. 3 are by way of illustration only and should not be construed so as to limit the scope of the present disclosure or the claims that follow to a mobile phone implementation only.

FIG. 3 illustrates in greater detail exemplary mobile phone 121 (i.e., UE 121) that implements dynamic switching of the Advanced Calling Feature (DSAC) according to embodiments of the disclosure. Mobile phone 121 comprises core circuitry 300, which includes read-only memory (ROM) 305, random access memory (RAM) 310, central processing unit (CPU) 315, digital signal processor (DSP) 320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. The protocol stack 314 in memory 312 may include software for implementing dynamic switching of Advanced Calling Feature (DSAC) operations that enable mobile phone 121 to switch modes as illustrated above in FIGS. 2A and 2B.

Mobile phone 121 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 121. In an exemplary embodiment, CPU 315 executes applications 312 and protocol stack 314. CPU 315 runs the application layer and a wide variety of applications may be run in a smart phone implementation. Applications 312 may include audio, video, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian, java, android, RT-Linux, Palm, and the like. For time critical applications, CPU 315 runs a real-time operating system (RTOS). In addition to the physical layer, there are other layers, including protocol stack 314, that enable mobile phone 121 to work with a network base station. In an exemplary embodiment, protocol stack 314 is ported on CPU 315.

DAC/ADC circuitry block 325 converts analog speech signals to digital signals, and vice versa, in mobile phone 121. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 121. BB circuitry block 330 converts voice and data to be carried over the air interface to I/Q baseband signals. In an exemplary embodiment of the disclosure, DSP 330 is responsible for measuring the values of RSRP and SINR and comparing the measured values to the threshold values: rsrp_hVolte_drop, SINR_hVolte_drop, t_hVolte_drop, rsrp_hVolte_add, SINR_hVolte_add, and t_hVolte_add. The results of the measurements may be reported to CPU 315 for further action regarding moving into and out of VoLTE only mode and SRLTE mode. Together, CPU 315 and DSP 330 comprise a controller that controls the mode switching operations of mobile phone 121 between LTE only mode and SRLTE mode based on the threshold comparisons.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 121, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RX switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands.

Mobile phone 121 provides connectivity with laptops or other devices using WiFi (or WLAN) transceiver 370, BT transceiver 365, and universal serial bus (USB) interface 355. Mobile phone 121 also uses GPS receiver 360 in applications 312 that require position information. If mobile phone 121 is a conventional smart phone, applications 312 may include many popular applications, such as Facebook, Twitter, a browser, and numerous games that come pre-installed with mobile phone 121.

Speaker and microphone circuitry block 375 comprises microphone circuitry (or mic) that converts acoustic energy (i.e., air pressure changes caused by speech or other sounds) to electrical signals for subsequent processing. Speaker and microphone 375 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

Mobile phone 121 preferably includes camera 390. Presently, almost all mobile phones feature a camera module. Camera 390 may comprise a 12 megapixel, 14 megapixel, or a 41 megapixel camera. Display 385 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 380 may comprise a simple matrix type keypad that contains numeric digits (0 to 9), alphabetic characters (A to Z), special characters, and specific function keys. In a more advanced embodiment for a smart phone implementation, keypad 380 may be implemented in the mobile phone software, so that keyboard 380 appears on display 385 and is operated by the user using the touch of a finger tip.

Figure 4:
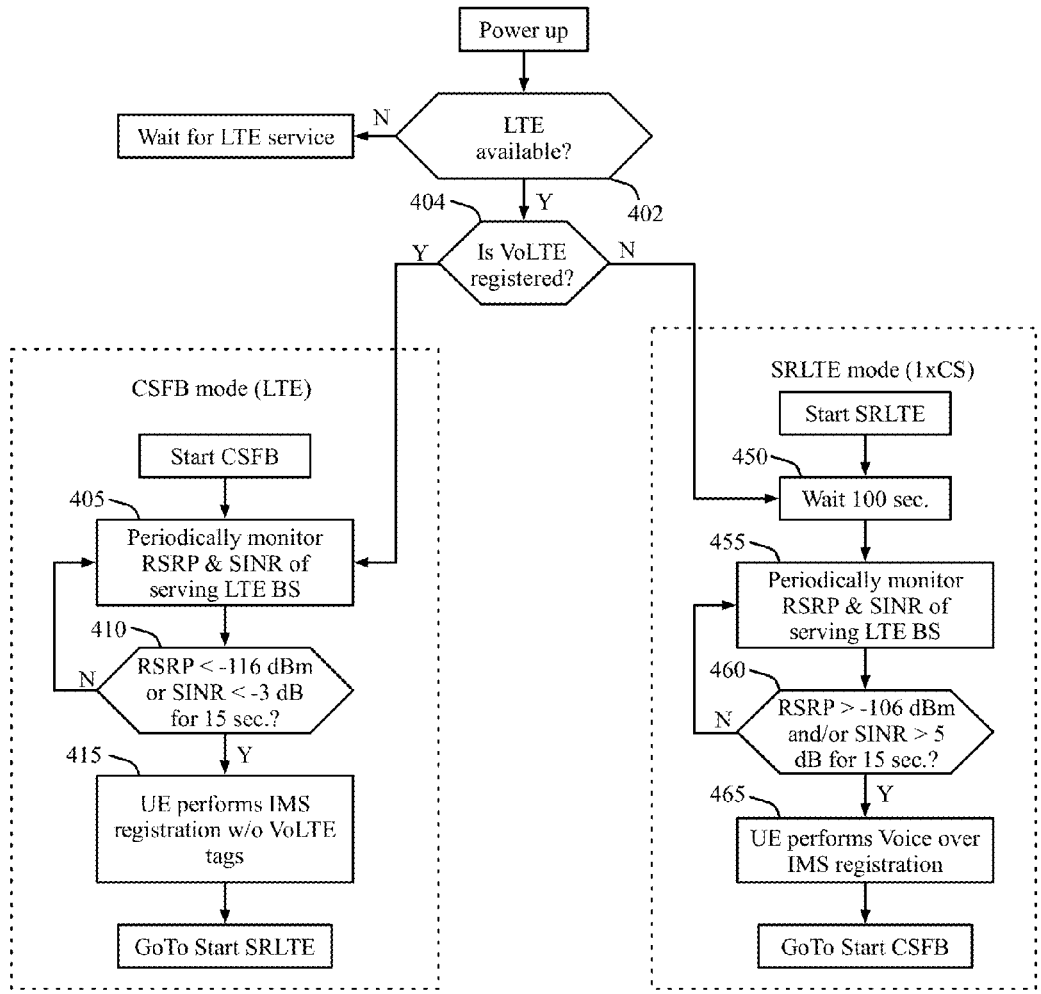
FIG. 4 is a flow diagram depicting in greater detail a dynamic switching of the Advanced Calling (DSAC) according to one embodiment of the disclosure.

FIG. 4 is a flow diagram depicting in greater detail a dynamic switching of the Advanced Calling Feature (DSAC) according to one embodiment of the disclosure. Initially, UE 121 powers up and determines if LTE service is available in the local carrier network (step 402). If LTE is not available (No in step 402), UE 121 waits for LTE service in automatic mode. If LTE is available (Yes in step 402), then UE 121 determines if UE 121 is registered for VoLTE service (step 404). If UE 121 is registered for VoLTE (Yes in step 404), the UE 121 enters LTE only mode (or circuit-switched fallback (CSFB) mode). If UE 121 is not registered for VoLTE (No in step 404), the UE 121 enters SRLTE mode (or 1×CS mode), such as, for example, 1×RTT CDMA.

In CSFB/LTE only mode, UE 121 periodically monitors the values of RSRP and SINR for the serving LTE base station (step 405). If the RSRP value does not fall below the rsrp_hVolte_drop threshold value (e.g., −116 dBm) and the SINR value does not fall below the SINR_hVolte_drop threshold value (e.g., −3 dB) for a period of at least the t_hVolte_drop threshold value (e.g., 15 seconds) (No in step 410), then UE 121 continues to monitor the RSRP and SINR values. If either the RSRP value falls below the rsrp_hVolte_drop threshold value or the SINR value falls below the SINR_hVolte_drop threshold value for a period of at least the t_hVolte_drop threshold value (Yes in step 410), then UE 121 performs a new IMS registration with VoLTE tags removed (step 415) and enters SRLTE mode in which UE 121 receives voice service from the legacy network (e.g., 1×RTT) and receive packet service from the LTE network.

After UE 121 enters SRLTE mode, UE 121 waits for a period of 100 second to prevent excessive switching between LTE only mode and SRLTE mode (step 450). Next, UE 121 periodically monitors the values of RSRP and SINR for the serving LTE base station (step 455). If the RSRP value does not rise above the rsrp_hVolte_add threshold value (e.g., −106 dBm) and/or the SINR value does not rise above the SINR_hVolte_add threshold value (e.g., 5 dB) for a period of at least the t_hVolte_add threshold value (e.g., 15 seconds) (No in step 460), then UE 121 continues to monitor the RSRP and SINR values. If either the RSRP value rises above the rsrp_hVolte_add threshold value and/or the SINR value rises above the SINR_hVolte_add threshold value for a period of at least the t_hVolte_add threshold value (Yes in step 460), then UE 121 performs voice over IMS registration (step 465) and enters CSFB/LTE only mode in which UE 121 receives both Voice over LTE service and packet data service from the LTE network.

Figure 5:
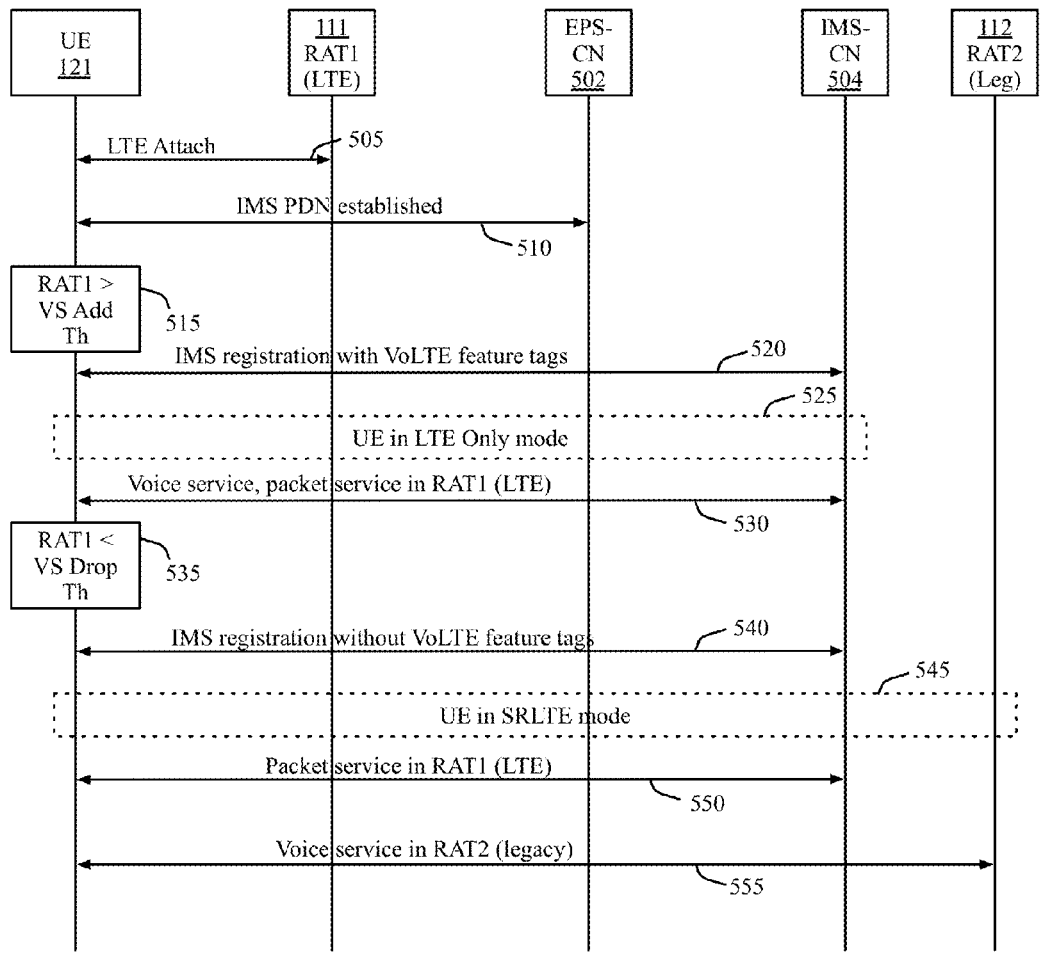
FIG. 5 is a message flow diagram illustrating dynamic switching of the Advanced Calling (DSAC) according to one embodiment of the disclosure.

FIG. 5 is a message flow diagram illustrating dynamic switching of the Advanced Calling (DSAC) according to one embodiment of the disclosure. FIG. 5 depicts initial attachment of UE 121 after a power up, radio link failure (RLF) recovery, out-of-service (OOS) recovery, Better Service Reselection (BSR) and the like. Communication links are established between BS 111 of the RAT1 (LTE) network, Evolved Packet Services-Core Network (EPS-CN) 502, IP Multimedia Subsystem-Core Network (IMS-CN) 504, and BS 112 of the RAT2 (legacy) network. UE 121 initially attaches to BS 111 (step 505). UE 121 then establishes an IMS PDN connection with the EPS-CN 502 (step 510).

At some point, the link quality in the RAT1 (LTE) network rises above one or both of the Voice Service (VS) Add thresholds (e.g., rsrp_hVolte_add, SINR_hVolte_add) described above (step 515). In response, UE 121 performs IMS registration with VoLTE feature tags with IMS-CN 504 (step 520). At that point, UE 121 enters LTE only mode on the RAT1 network (step 525). Thereafter, UE 121 receives both voice service and packet service in the RAT1 network (step 530).

At some point, the link quality in the RAT1 (LTE) network falls below one or both of the Voice Service (VS) Drop thresholds (e.g., rsrp_hVolte_drop, SINR_hVoltedrop) described above (step 535). In response, UE 121 performs IMS registration without VoLTE tags with IMS-CN 504 (step 540). At that point, UE 121 enters SRLTE mode on the RAT2 network (step 545). Thereafter, UE 121 receives packet service in the RAT1 network (step 550) and receives voice service in the RAT2 network (step 555).

Figure 6:
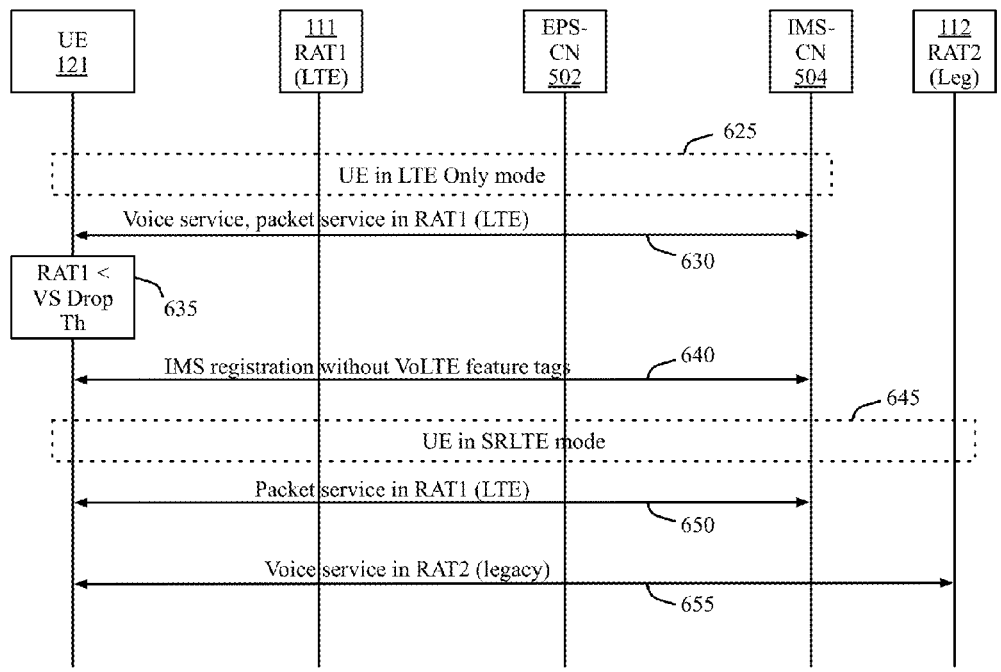
FIG. 6 is a message flow diagram illustrating dynamic switching of the Advanced Calling (DSAC) according to one embodiment of the disclosure.

FIG. 6 is a message flow diagram illustrating dynamic switching of the Advanced Calling (DSAC) according to one embodiment of the disclosure. FIG. 6 depicts switching from LTE only mode to SRLTE mode. Initially, UE 121 operates in LTE only mode on the RAT1 network (step 625). UE 121 receives both voice service and packet service in the RAT1 network (step 630).

At some point, the link quality in the RAT1 (LTE) network falls below one or both of the Voice Service (VS) Drop thresholds (e.g., rsrp_hVolte_drop, SINR_hVoltedrop) described above (step 635). In response, UE 121 performs IMS registration without VoLTE tags with IMS-CN 504 (step 640). Once the VoLTE tags are removed from IMS registration, UE 121 moves to SRLTE mode and sends a 1×RTT registration. At that point, UE 121 operates in SRLTE mode on the RAT2 network (step 645). Thereafter, UE 121 receives packet service in the RAT1 network (step 650) and receives voice service in the RAT2 network (step 655).

Figure 7:
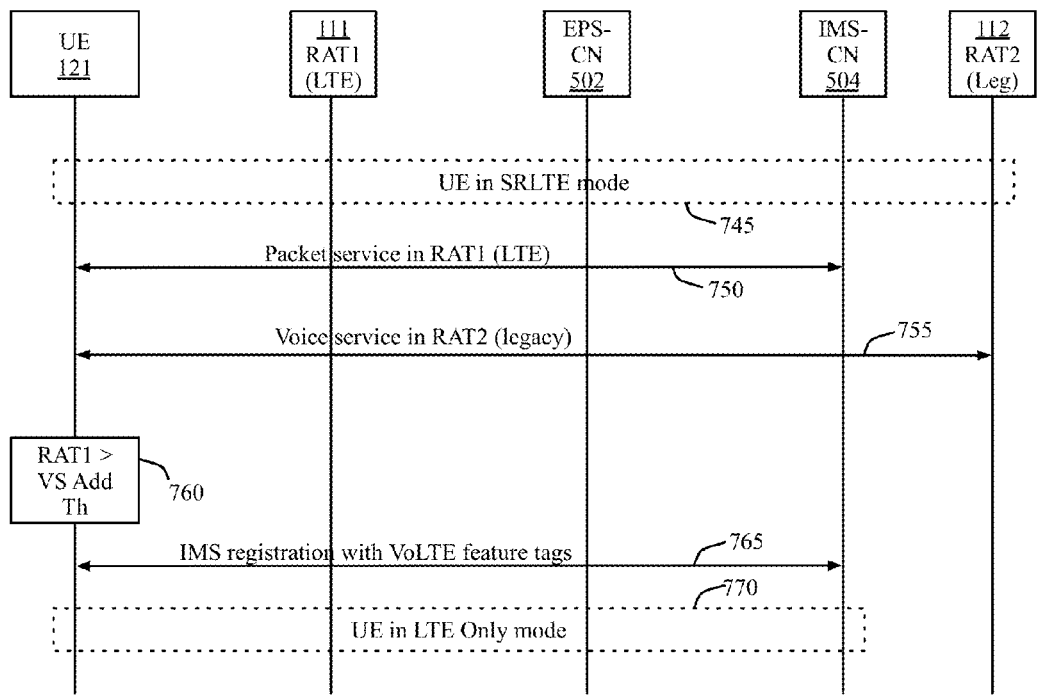
FIG. 7 is a message flow diagram illustrating dynamic switching of the Advanced Calling (DSAC) according to one embodiment of the disclosure.

FIG. 7 is a message flow diagram illustrating dynamic switching of the Advanced Calling (DSAC) according to one embodiment of the disclosure. FIG. 7 depicts switching from SRLTE mode to LTE only mode. Initially, UE 121 operates in SRLTE mode on the RAT2 network (step 745). UE 121 receives packet service in the RAT1 network (step 750) and receives voice service in the RAT2 network (step 755).

At some point, the link quality in the RAT1 (LTE) network rises above one or both of the Voice Service (VS) Add thresholds (e.g., rsrp_hVolte_add, SINR_hVolte_add) described above (step 760). In response, UE 121 performs IMS registration with VoLTE feature tags with IMS-CN 504 (step 765). At that point, UE 121 enters LTE only mode on the RAT1 network (step 770) and receives both voice service and packet service in the RAT1 network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment configured to operate in a Long Term Evolution (LTE) network, the user equipment comprising:
   transceiver circuitry configured to operate the user equipment in either of two modes, the two modes comprising:
      a first mode in which the transceiver circuitry performs packet data services in the LTE network and performs voice calls in the LTE network using a Voice over LTE (VoLTE) service; and
      a second mode in which the transceiver circuitry performs packet data services in the LTE network and performs voice calls in a legacy network; and
   a controller processor coupled to the transceiver circuitry and configured to:
      compare a link quality associated with a radio link of the LTE network to at least one threshold value, and
      in response to the comparison, control switching the user equipment between the first mode and the second mode if the link quality one of:
         falls below a first drop threshold value or a second drop threshold value for more than a drop period of time threshold value;
         rises above a first add threshold value or a second add threshold for more than an add period of time threshold value; or
         only if a pre-defined time delay has elapsed since a previous switching between the first mode and the second mode.

2. The user equipment as set forth in claim 1, wherein the processor switches the user equipment from the first mode to the second mode if the link quality falls below the first drop threshold value associated with a Reference Signal Received Power (RSRP) value.

3. The user equipment as set forth in claim 2, wherein the processor switches the user equipment from the first mode to the second mode if the link quality falls below second drop threshold value associated with a Signal to Interference plus Noise Ratio (SINR) value.

4. The user equipment as set forth in claim 1, wherein the processor switches the user equipment from the second mode to the first mode if the link quality rises above the first add threshold value associated with a Reference Signal Received Power (RSRP) value.

5. The user equipment as set forth in claim 4, wherein the processor switches the user equipment from the second mode to the first mode if the link quality rises above the second add threshold value associated with a Signal to Interference plus Noise Ratio (SINR) value.

6. A method of operating a user equipment in a Long Term Evolution (LTE) network, the method comprising:
   operating in either of two modes, the two modes comprising:
      a first mode in which the user equipment performs packet data services in the LTE network and performs voice calls in the LTE network using a Voice over LTE (VoLTE) service; and
      a second mode in which the user equipment performs packet data services in the LTE network and performs voice calls in a legacy network; and
   comparing a link quality associated with a radio link of the LTE network to at least one threshold value; and
   in response to the comparison, switching the user equipment between the first mode and the second mode if the link quality one of:
      falls below a first drop threshold value or a second drop threshold value for more than a drop period of time threshold value;
      rises above a first add threshold value or a second add threshold for more than an add period of time threshold value, or
      only if a pre-defined time delay has elapsed since a previous switching between the first mode and the second mode.

7. The method as set forth in claim 6, wherein switching the user equipment between the first mode and the second mode comprises switching the user equipment from the first mode to the second mode if the link quality falls below the first drop threshold value associated with a Reference Signal Received Power (RSRP) value.

8. The method as set forth in claim 7, wherein switching the user equipment between the first mode and the second mode comprises switching the user equipment from the first mode to the second mode if the link quality falls below the second drop threshold value associated with a Signal to Interference plus Noise Ratio (SINR) value.

9. The method as set forth in claim 6, wherein switching the user equipment between the first mode and the second mode comprises switching the user equipment from the second mode to the first mode if the link quality rises above the first add threshold value associated with a Reference Signal Received Power (RSRP) value.

10. The method as set forth in claim 9, wherein switching the user equipment between the first mode and the second mode comprises switching the user equipment from the second mode to the first mode if the link quality rises above the second add threshold value associated with a Signal to Interference plus Noise Ratio (SINR) value.

\* \* \* \* \*